Patented Apr. 12, 1949

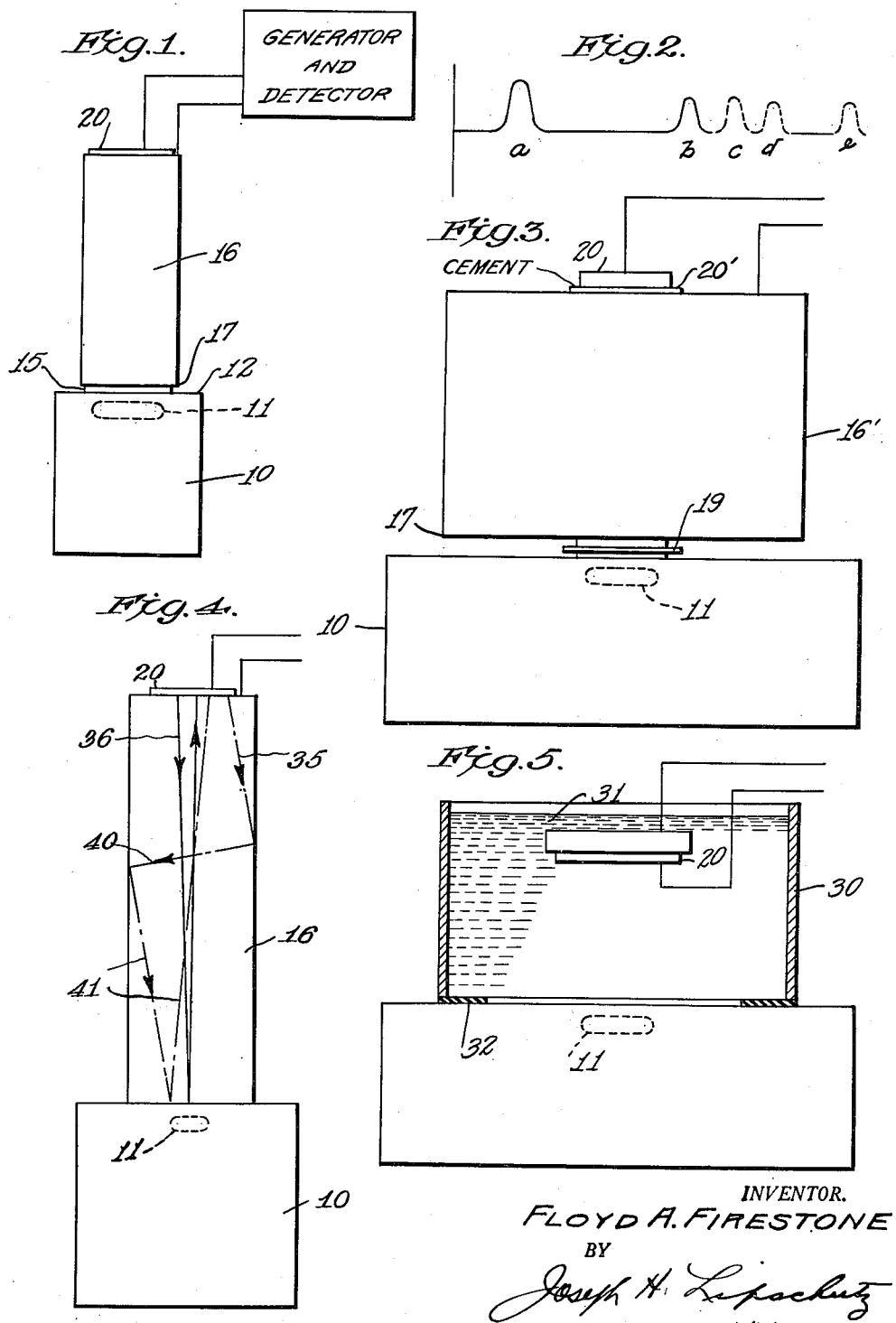

2,467,301

UNITED STATES PATENT OFFICE 2,467,301

SUPERSONIC INSPECTION FOR FLAWS LYING NEAR THE SURFACE OF A PART

Floyd A. Firestone, Ann Arbor, Mich., assignor to Sperry Products, Inc., Hoboken, N. J., a corporation of New York Application July 23, 1945, Serial No. 606,494

3 Claims. (Cl. 73—67)

1

This invention relates to the supersonic inspection of materials, particularly in those cases where the flaw to be detected lies near the surface of the part to be inspected. In my Patent No. 2,280,226, granted April 21, 1942, I have disclosed one form of supersonic inspection device which consists in sending, by means such as an electroacoustic transducer including a quartz crystal, a short supersonic wave train into the part to be inspected and detecting, by a similar electroacoustic transducer, the reflection of said wave train from any flaws which may be present in the interior of the solid. The reflected wave train is amplified by suitable thermionic amplifier means. In the form of my invention disclosed in said patent, some difficulty is experienced in those cases where the flaws to be detected lie closer to the sending crystal than one-half inch. The reason for this difficulty lies in the fact that the waves reflected back to the sending point start arriving before the transmission of the wave train has ceased. Another reason for this difficulty is to be found in the fact that the amplifier associated with the receiving or detecting means is overloaded by the transmission of the wave train and requires some time for recovering its sensitivity after the wave transmission has ceased.

It is therefore one of the objects of this invention to provide means whereby a supersonic device, such as disclosed in my said patent, may be rendered applicable to those cases where flaws are to be detected in a solid part in a region lying close to that surface of the part through which the wave trains enter. For this purpose, I provide means for increasing the time interval which elapses between the transmission of a wave train and the receiving of said wave train after being reflected by a defect lying close to the surface of the solid part.

In supersonic testing by the use of wave trains as shown in my said patent, it is desirable that wave trains be of predetermined short duration and that such duration should not be prolonged by the free vibration of the piezo-electric element after the energization of such element has ceased. It is therefore an object of this invention to provide means for quickly damping the free vibration of the piezo-electric element utilized in generating the wave trains.

Further objects and advantages of this invention will become apparent in the following detailed description thereof.

In the accompanying drawings,

Fig. 1 is a front elevation, somewhat diagrammatic, illustrating the principle, and disclosing one form, of this invention.

Fig. 2 is a graph showing the indications which may be received by an indicator, such as an oscilloscope, utilized in my invention.

Fig. 3 is a view similar to Fig. 1 showing a modified form of the invention.

Fig. 4 is a view similar to Fig. 1, largely diagrammatic, illustrating the theory underlying the Fig. 3 form of the invention.

Fig. 5 is a front elevation, partly sectioned vertically, showing still another form of this invention.

Referring first to Fig. 1, it is desired to test a solid part 10 for flaws such as the one indicated at 11 which may lie adjacent the surface 12 of the solid part. The term "solid part" is used here to mean a bounded piece of solid material. In applying the invention shown in my Patent No. 2,280,226, a piezo-electrical crystal 20 would be applied to the surface 12 and a supersonic wave train generated as shown in said patent would be transmitted into the solid 10 through an oil film 15 designed to provide an effective path for the supersonic waves into the solid. The oil film is shown greatly exaggerated for purposes of illustration but is not more than one-half a wave length in thickness. Such an arrangement, however, would cause the wave train to be reflected back from the flaw 11 in such short time interval that the transmission of the wave train will not have been completed by the time the reflected wave train has reached the receiver. Also the amplifier in the receiving mechanism will not have regained its sensitivity after having been overloaded by the transmitted wave train. Therefore, if flaws lying adjacent the surface 12 of the solid are to be tested, some method and means must be provided for increasing the time interval which elapses between the sending of the wave train and the receiving of the reflection thereof from flaws such as flaws 11 located adjacent the surface of the solid through which the transmitted waves enter.

One solution of this problem is disclosed in Fig. 1 wherein there is interposed between the surface 12 and the sending crystal 20 an intermediate member 16 of some material which conducts supersonic waves. It will now be apparent that the wave train generated by sending crystal 20 must traverse the intermediate member 16 before entering the solid 10 and before reaching the flaw 11. This time interval is doubled by the time the wave train reaches the receiving or detecting mechanism which may be the same crystal 20 or a separate crystal located adjacent crystal 20. The length of intermediate member 16 is so selected that the time interval which elapses between the sending of a wave train and the receiving thereof after reflection from the flaw 11 will be sufficient to permit the sending wave train to be completed and to permit the thermionic amplifier in the detecting mechanism to regain its sensitivity after responding to the wave train. The reflection pattern appearing on the oscilloscope will then be as shown in Fig. 2 wherein the indication $a$ is that due to the transmitted wave train. The reflection from the interface formed by the junction of intermediate member 16, film 15 and face 12 will produce a much smaller indication $b$, while the reflection from the flaw 11 will appear as an indication $c$. It will be seen that the distance between $a$ and $b$ represents the added time interval introduced by interposing the member 16. Thus the indication $c$ which would ordinarily merge into the right hand portion of indication $a$ if the sending crystal 20 engaged surface 12, is now spaced a substantial distance from the indication $a$. Indication $b$ is close to indication $c$, but it is much smaller than $a$ and therefore not only does not interfere with $c$ but also the reflected wave train represented by $b$ is of such small magnitude that its receipt by the detector amplifier does not overload the amplifier and render said amplifier insensitive.

While Fig. 1 discloses the principle and one embodiment of this invention, an improvement thereof is disclosed in Fig. 3. This form of the invention is designed to avoid a difficulty which may arise under certain operating conditions when using the Fig. 1 form. This difficulty is shown in the diagrammatic representation of Fig. 4 wherein it will be seen that the diagonally radiated longitudinal wave 35 (indicated in dash lines) strikes the side of the interposed member 16 at an angle, giving rise in part to a shear wave 40 which, upon striking the opposite wall, is again transformed in part into a longitudinal wave 41 which strikes the solid part 10 and is reflected back to the receiving crystal 20. The reflections shown by the dash line represent only one subsidiary reflection, and other subsidiary reflections will arise from shear waves having traveled across the member 16 two, three, or more times. Since the shear wave thus generated in these subsidiaries travels only about half as fast as the longitudinal wave, the total time consumed by the subsidiary wave from the time it is generated until it returns to crystal 20 is considerably delayed relative to the main longitudinal beam shown in the full lines, since the latter goes straight down and back. The longer time consumed by the subsidiary reflection may produce an indication which interferes with the indication from the flaw. In other words, the time of travel of the subsidiary reflection may be substantially the same as the time of travel of the main beam from the crystal 20 to the flaw and return. Thus, the indication $c$ in Fig. 2 may be obscured.

The form of the invention shown in Fig. 3 is intended to remedy the condition just described. By making the lateral dimension of intermediate member 16' large, two desirable results are obtained. First, the amount of diagonally radiated longitudinal wave striking the side of member 16' is reduced and therefore there is a reduction in the energy of the subsidiary reflections. Second, the time interval required by the subsidiary reflection to return to the crystal 20 is increased sufficiently so that the indication due to such subsidiary reflection will appear beyond the point where the indication $c$ representing a flaw near the surface of solid part 10 would appear on the oscilloscope. Thus, referring to Fig. 2 it will be seen that reflections $d$ and $e$ corresponding to the subsidiary reflections in the Fig. 3 form appear at a point to the right of indication $c$ due to reflection of the main longitudinal beam from a flaw. The form shown in Fig. 3 is advantageous in another respect in that the subsidiary reflections from the lower corners 17 of the interposed member also have a longer path of travel and will also appear to the right of indication $c$ on the oscilloscope.

Still another form of intermediate member designed to increase the time interval between sending and receiving of the wave train is disclosed in Fig. 5. In this form a container such as 30 is filled with a fluid 31 and held against the solid 10 by means such as gasket 32 to prevent leakage. The container 30 is filled with a liquid which preferably attenuates supersonic waves so that the standing waves or repeated reflections from the crystal 20 to the surface 12 will be substantially reduced.

It has been stated that the reflection $b$ from the interspace between members 16 and 10 is small in comparison to the indication $a$ from the sending wave train. The indication $b$ due to interspace can be made still smaller, and the indication $c$ due to the flaw can be made larger. The strength of the reflection $b$ is due largely to the oil film 15. If a substance, such as mercury, were employed instead of oil, a much greater percentage of the energy would be transmitted through the film and less energy would be reflected back. Mercury, however, does not wet most metals and it is difficult to get a film of mercury to stay in the interspace between parts 16 and 10. To render the mercury useful as a film between said members, I make use of a piece of silver foil 19, which is first amalgamated and then dipped in mercury and placed between parts 16 and 10. The silver amalgam then holds the mercury in the interspace, the indication $b$ is small and, since more energy passes through the solid 10, a strong reflection will be obtained from the flaw and, hence, a larger indication $c$ will be obtained.

As stated in the introduction hereto, the free vibration of the piezo-electric element 20 after the energization thereof has ceased will cause a prolongation of the wave train to such extent that it is difficult to distinguish the reflected wave train from the original transmitted wave train. Such prolongation results in a long tail at the end of each reflected wave train. It is therefore desirable that the free vibration of the piezo-electric element be damped as quickly as possible as soon as the energization of the element has ceased. I have disclosed two methods for accomplishing this result, both of which depend upon utilization of the theory that damping will be effected more quickly if the crystal 20 can be strongly coupled to a solid member, either the member 16 or the member 10, since such strong coupling means in effect that the mass of the solid body is added to the mass of the crystal, and hence, the vibrations are quickly and effectively damped. Heretofore, the crystal 20 was applied to the testing of a body 10 by direct contact therewith, with only an oil film to couple the crystal to the solid member. The oil film proved to be a loose coupling which therefore did not effectively add the mass of the solid member 10 to the mass of the crystal, and hence, quick damping was not obtained. Strong coupling between the crystal and the solid mass by, for example, cementing the crystal to the block 10 was not always practical, since this would introduce a long time delay in cementing the crystal to the block and then removing the same. However, by using an interposed block 16 I am enabled to cement the crystal 20 directly to the block 16, as shown at 20', thus obtaining strong coupling and quick damping, while the block 16 may be connected to the block 10 under test by an oil film or other fluid connection. The crystal 20, having once been cemented to the block 16, need not be removed, but the block 16 may be utilized for quick connection to successive blocks 10 to be tested by merely interposing the liquid film between the block 16 and the block 10.

As an alternative method of securing strong coupling between the crystal and a solid member so that the mass of the solid member will be effectively utilized for damping the vibrations of the crystal, I may employ a mercury film, such as the silver amalgam 19 heretofore described, since the amalgam also provides a strong coupling between the crystal and the solid member. The amalgam being more readily attached and detached, such amalgam may be used directly between the crystal 20 and the block 10 under test.

In accordance with the provisions of the patent statutes, I have herein described the principle and operation of my invention, together with the apparatus which I now consider to represent the best embodiment thereof, but I desire to have it understood that the apparatus shown is only illustrative, and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. Apparatus for testing a bounded part by sending supersonic wave trains into the part and receiving the reflected wave trains, comprising means for transmitting supersonic wave trains toward said part, means for receiving said wave trains, and means capable of conducting said wave trains and interposed between said transmitting means and said part for increasing the time interval between transmitting and receiving of the wave trains, said interposed means being of such dimension in the direction longitudinal of wave train travel that the reflected wave trains are received after the transmission of the wave trains is completed.

2. Apparatus for testing a bounded part by sending supersonic wave trains into the part and receiving the reflected wave trains, comprising means for transmitting supersonic wave trains toward said part, means including a thermionic amplifier for receiving said wave trains, and means capable of conducting said wave trains and interposed between said transmitting means and said part for increasing the time interval between transmitting and receiving of the reflected wave trains, said interposed means being of such dimension in the direction longitudinal of wave train travel that the reflected wave trains are received after the transmission of the wave trains is completed and after said amplifier has regained its sensitivity following reception of the transmitted wave trains.

3. Apparatus for testing a bounded part by sending supersonic wave trains into the part and receiving the reflected wave trains, comprising means for transmitting supersonic wave trains toward said part, means for receiving said wave trains, and means capable of conducting said wave trains and interposed between said transmitting means and said part for increasing the time interval between transmitting and receiving of the wave trains, said interposed means being of such dimension in the direction longitudinal of wave train travel that the reflected wave trains are received after the transmission of the wave trains is completed, and said interposed means being of such dimension in a lateral direction with respect to the direction of wave train transmission that the time of travel of wave trains reflected from said interposed means at an angle to the longitudinal direction will be greater than the time of travel of wave trains reflected substantially longitudinally from defects within said part.

FLOYD A. FIRESTONE.

REFERENCES CITED

The following references are of record in the file of this patent:

UNITED STATES PATENTS

| Number | Name | Date |
|---|---|---|
| 1,693,806 | Cady | Dec. 4, 1928 |
| 2,263,902 | Percevial | Nov. 25, 1941 |
| 2,280,226 | Firestone | Apr. 21, 1942 |
| 2,401,094 | Nicholson, Jr. | May 28, 1946 |